US009235327B2

(12) United States Patent
Milam et al.

(10) Patent No.: US 9,235,327 B2
(45) Date of Patent: Jan. 12, 2016

(54) APPLYING CONTEXTUAL FUNCTION TO A GRAPHICAL USER INTERFACE USING PERIPHERAL MENU TABS

(71) Applicant: International Business Machines Corporation, Armonk, NY (US)

(72) Inventors: Jennifer L. Milam, Sacramento, CA (US); Sarah C. Nelson, Lookout Mountain, TN (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/872,883

(22) Filed: Apr. 29, 2013

(65) Prior Publication Data

US 2014/0325425 A1    Oct. 30, 2014

(51) Int. Cl.
G06F 3/048 (2013.01)
G06F 3/0482 (2013.01)

(52) U.S. Cl.
CPC .... G06F 3/0482 (2013.01); *G06F 2203/04804* (2013.01)

(58) Field of Classification Search
CPC ..... G06F 9/4443; G06F 3/0482; G06F 3/048; G06F 2203/04804; G06F 2203/04805
USPC ........................................................ 715/777
See application file for complete search history.

(56) References Cited

U.S. PATENT DOCUMENTS

| | | | |
|---|---|---|---|
| 6,037,937 A * | 3/2000 | Beaton et al. | 715/764 |
| 6,448,987 B1 | 9/2002 | Easty et al. | |
| 6,549,219 B2 | 4/2003 | Selker | |
| 7,411,519 B1 * | 8/2008 | Kuntman et al. | 340/968 |
| 7,752,566 B1 * | 7/2010 | Nelson | 715/769 |
| 2006/0294475 A1 * | 12/2006 | Holecek et al. | 715/781 |
| 2007/0283292 A1 * | 12/2007 | Bucher | G06F 3/0482 715/810 |
| 2010/0017732 A1 * | 1/2010 | Matsushima et al. | 715/765 |
| 2010/0281374 A1 | 11/2010 | Schulz et al. | |
| 2011/0055760 A1 | 3/2011 | Drayton et al. | |
| 2011/0231796 A1 | 9/2011 | Vigil | |

FOREIGN PATENT DOCUMENTS

EP    1469375 B1    7/2011

* cited by examiner

*Primary Examiner* — Namitha Pillai
*Assistant Examiner* — Terri Filosi
(74) *Attorney, Agent, or Firm* — Jason H. Sosa; Noah A. Sharkan (57) ABSTRACT

A computing device displays a set of graphical user interface (GUI) elements each having a respective transparent portion positioned over all or part of an underlying GUI element, which displays underlying content. Each set of GUI elements includes a respective set of peripherally located menu tabs and each menu tab includes a respective set of icons including a first icon corresponding to the first menu tab of a first GUI element. Each selected icon affects content that is displayed in a corresponding transparent portion, including the underlying content displayed within the underlying GUI element that is within the corresponding transparent portion. The computing device receives input selecting the first icon and in response applies a first modification to the content displayed within a first transparent portion which corresponds to the first GUI element and includes the underlying content that is within the first transparent portion.

20 Claims, 6 Drawing Sheets

APPLYING CONTEXTUAL FUNCTION TO A GRAPHICAL USER INTERFACE USING PERIPHERAL MENU TABS

FIELD OF THE INVENTION

The present invention relates generally to the field of computer graphical user interfaces, and more particularly to the positioning and functionality of menu tabs for a graphical user interface.

TECHNICAL FIELD/BACKGROUND

The ability to easily interact with the function and features of a software application distinguishes one application from another. A graphical user interface (GUI) allows a user to interact with a computer application through graphical controls. A pointing device, touch-screen, or in some cases a keyboard, can be used to select and manipulate graphical controls of a computer application, as opposed to entering text commands. Many types of GUI elements have been employed to improve the interoperability of users and computer software. Floating windows, pop-ups, pull-downs, dialog boxes, scrolling bars, menus, and tool bars are all examples of objects used as GUI elements to facilitate software usability.

Common selections techniques include linear lists, displayed in a common order, such as alphabetically, listed vertically, from which a selection is made by an input device. In some cases the more popular or more frequently used selections may be positioned at the top of a list, but as a list grows in length, it becomes more difficult to locate specific items or recall the location or path-to-location for more infrequently used selections.

Contextual menus offer options intended to most likely apply to the active content, but are usually generic in nature.

A GUI may make use of icons, cursors, pop-up menus, and menu bars, to make changes, apply functionality, or both, to the content of an active application, file or window. The objective of the organization and behavior of various GUI elements is to provide the most likely required functions for the current activity and facilitate discovery and access of applying the functions. Typically this involves use of an input device such as a mouse or other pointing device or various touching techniques on a touch screen display. Options of activity or function are displayed in lengthy drop-down menus, many with nested levels that add complexity to discovery and selection of the desired activity or function. A typical menu action may require selection of an active window, selection of content within the displayed area using an input device, such as clicking an icon or text, scrolling through a list of options, selecting one or more sub-menus and selecting the desired activity or function. Remembering where options are located adds to the difficulty of menu use. Alternative menu designs offer some relief but still require redirection of focus away from the active content and selection of the content to which the menu option applies.

SUMMARY

Embodiments of the present invention disclose a method, computer program product, and system for modifying content displayed on a computing device. A computing device displays a set of graphical user interface (GUI) elements each having a respective transparent portion positioned over all or part of an underlying GUI element, the underlying GUI element displays underlying content, wherein each of the set of GUI elements includes a respective set of peripherally located menu tabs including a first menu tab corresponding to a first GUI element, and each menu tab includes a respective set of icons including a first icon corresponding to the first menu tab, each icon, when selected, affects a manner in which content is displayed in a corresponding transparent portion, including the underlying content displayed within the underlying GUI element that is within the corresponding transparent portion. The computing device receives input selecting the first icon from the first menu tab of the first GUI element, and in response to receiving the input selecting the first icon, the computing device applies a first modification to the content displayed within a first transparent portion which corresponds to the first GUI element and includes the underlying content of the underlying GUI element that is within the first transparent portion.

DETAILED DESCRIPTION

Embodiments of the present invention recognize that accessing menu items to apply a function or effect to content displayed in a window of a computing device display, is commonly practiced. For example, word processing applications typically include multiple menus, each providing lists of options, many nested as lists within lists. Locating specific options within a cascade of menu items can be confusing, challenging and time consuming. Displayed lists of menu options obscure the active content area, and user focus is redirected away from the primary content within an active GUI element, to discover, interpret and apply the desired option.

Embodiments of the present invention provide a set of GUI elements that include at least one GUI element, each having one or more menu tabs positioned peripherally on a respective GUI element. The menu tabs may extend outward or inward from the periphery of the GUI element or may be positioned within the content area of the GUI element, with a preferred embodiment of the present invention having menu tabs extending outward from the periphery of the GUI element. The GUI element overlays part or all of an underlying GUI element, which may be a fixed position window that includes content depicted on a display device connected to a computing device. The GUI element includes transparency properties, referred to hereafter as transparency or transparent, that allow the underlying content to remain visible within the properly positioned GUI element, and properties allowing movement of the GUI element over areas of the underlying content, similar to the movement capabilities of a "floating window". The GUI element may have a shape and configuration that accommodates peripheral positioning of the one or more menu tabs. Menu tabs may include levels of transparency that allow underlying content to remain visible while menu tab content is still identifiable. Menu tabs include selectable menu options represented by one or more of: icons, symbols, numerals or text that facilitates identification of the behavior, function, action, or state to be applied to the content of the underlying window that is visible within the GUI element.

Embodiments of the present invention recognize that lengthy option searches, display interferences or loss of content focus by a user are significantly reduced or eliminated by menu tab location and contextual association of icons within a menu tab. In addition, the vision of a user of the GUI element remains on the content rather than shifting to locate and navigate through multiple menus of a menu tree. This lowers the memory load of the user by eliminating the processing of menu discovery as well as requirements to "record" the system state of their current activity, while pursuing a menu tree option. Various embodiments include the ability to stack GUI elements, placing one GUI element over another, and use the peripheral menu tab to select a GUI element from the overlapping GUI elements with menu tabs sharing a common border area at the periphery of the topmost GUI element. Implementation of such embodiments may take a variety forms and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java is a trademark of Oracle and its affiliates in the United States, other countries or both), Smalltalk, C++ or the like and conventional procedural programming languages, such as the "C" programming language or similar programming languages. The program code may execute entirely on a user's computer or a server computer, partly on the user's computer or a server computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
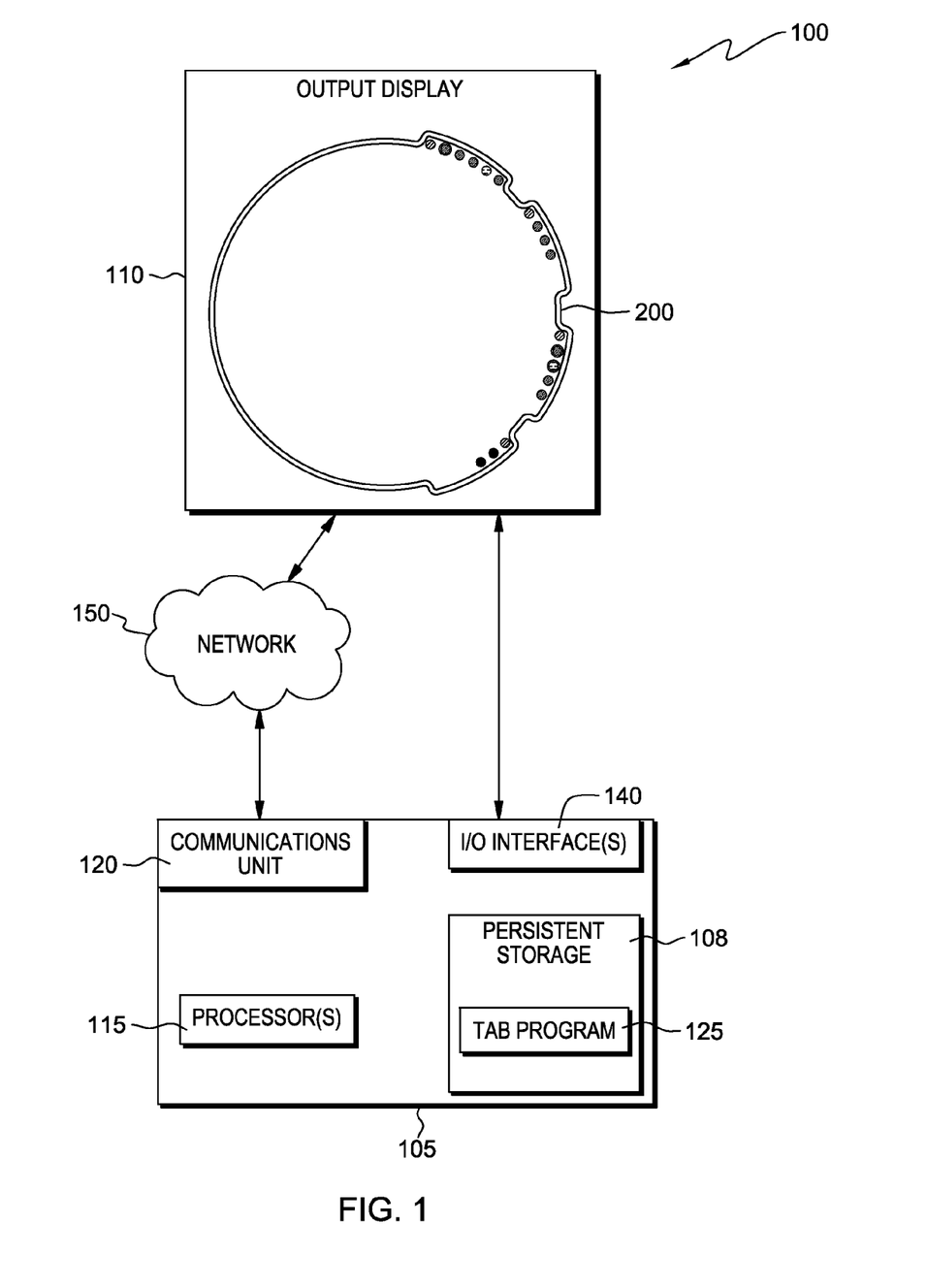
FIG. 1 is a block diagram illustrating a computing system including a graphical user interface element in accordance with an embodiment of the present invention.

The present invention will now be described in detail with reference to the Figures. FIG. 1 is a block diagram illustrating computing system 100 including computing device 105, GUI element 200, output display 110, and network 150, in accordance with an embodiment of the present invention. Computing device 105 includes communications unit 120, processor(s) 115, tab program 125 stored on persistent storage 108, input-output (I/O) interface(s) 140. Computing device 105 is configured to operate tab program 125 and display GUI element 200, in accordance with an embodiment of the present invention.

In various embodiments of the present invention, computing device 105 may be any computing device capable of communicating to other computing devices or computing components over a network. Computing device 105 can be a properly configured personal computer, a desktop computer, a personal digital assistant (PDA), a server computer, a blade server, laptop device, a mainframe computer, a multiprocessor system, a smart phone, a tablet computer, a microprocessor-based system, network PC, or a distributed cloud computing environment that includes any one or combination of the above systems or devices.

Computing device 105 may be remotely located with respect to output display 110, operating tab program 125, which provides user interface 200 on output display 110, via output over network 150. Alternatively, output display 110 may be connected by cable or wirelessly to computing device 105. In general, computing device 105 may be any programmable electronic device, configured to operate tab program 125, and output content to output display 110. Computing device 105 connects to network 150 by communications unit 120, which provides communications through the use of either or both physical and wireless links as described in further detail with respect to FIG. 8.

In one embodiment of the present invention, GUI element 200 overlays the display of content in an underlying GUI element that is generated by a different program working in conjunction with tab program 125. The underlying GUI element is a portion or full screen of content on a display device, for example, output display 110. GUI element 200 includes transparency properties, allowing the content displayed within the underlying GUI element, which falls within the transparent portion of GUI element 200, to be viewed through GUI element 200. The content displayed within the area of GUI element 200 includes part or all of the content from the underlying GUI element and is modified based on the icon function associated with a selected icon from a menu tab of GUI element 200.

Processor(s) 115 controls operational activity of computing device 105, including application programs, such as tab program 125. Processor(s) 115 is described in greater detail in the discussion of FIG. 8.

Tab program 125 displays a set of one or more GUI elements, such as GUI element 200, each having one or more menu tabs positioned at the periphery of the respective GUI element. Tab program 125 displays one or more icons, symbols, text, or numerals, included within each menu tab, and responds to the selection of a menu tab by making the associated GUI element the active GUI element. The term "icon" will be used subsequently in this document to include the use of a graphical icon, text, symbol or numeral that is included within a menu tab, and is associated with a behavior, function, action or state that is applied to the content displayed within the active GUI element, when selected. An active GUI element is positioned in the most forward position of content displayed on output display 110 and the icons within the menu tabs of the active GUI element are enabled for selection. Selection of an enabled icon applies the effect of the icon behavior, function, action and state, associated with the icon, to the content displayed within the GUI element. In various embodiments of the present invention, multiple icons are selected and the combined behavior, function, action and state are applied to the content within the active GUI element, for example, GUI element 200. Hereafter, the term "icon function" will be used to refer in brevity to the behavior, function, action, or state, associated with an icon.

The menu tabs of the GUI element respond to input from pointing devices, touch screens, keyboard entries or other input devices. In one embodiment, non-active GUI elements require selection of the GUI element before the content responds to input devices. Tab program 125 responds to the selection of an icon within the active menu tab, by applying an icon function, to the content displayed within GUI element 200. Tab program 125 indicates GUI and system status information in response to events generated by the user or system, for example tab program 125 displays an amber flashing in a display area within GUI element 200, or may cause a menu tab to flash, to indicate a warning or condition requiring attention, with respect to the content displayed.

I/O interface(s) 140 includes one or more devices providing input to computing device 105. For example, I/O interface(s) 140 may include keyboard key combinations, referred to herein as key codes, voice-recognition-assisted voice commands, a touch screen device, or a mouse or pointing device that includes a pointing device cursor that displays on output display 110. Alternatively, references hereafter referring to a pointing device also imply the alternative use of touch screen techniques, keyboard-based commands, voice-activated commands, or eye-tracking based commands, to make selections and provide input to activate features or relocate a GUI, such as GUI element 200.

The input device, referred to hereafter as the pointing device, is capable of hovering a pointing device cursor over a graphical object displayed on output display 110, selecting a graphical object by depressing or clicking, or double-clicking a button of the pointing device, and dragging a graphical object, which involves selecting the object and moving the object to a different location on the display device screen. Dragging a graphical object is accomplished by positioning the pointing device cursor over the graphical object to be dragged, selecting the graphical object by clicking a pointing device button, and while holding the button, moving the pointing device cursor and releasing the held button when the item being dragged is in the desired position on the display device screen, such as the display screen of output display 110.

Similarly, I/O interface(s) 140 may include the ability for hovering, selecting, and dragging, by using a touch-screen. A touch-screen input device may use touch, touch and hold, touch and swipe, in which a "swipe" is a combination of holding a touch and concurrently moving the touching item to a new position on the display screen, or other techniques to accomplish activity on output display 110 as described above with respect to a pointing device. The descriptions of input device operation actions are used as examples of input device control for managing the use and application of menu tabs and icons associated with a GUI element, such as GUI element 200. Examples presented herein may refer to the use of one type of input device, but embodiments of the present invention are not limited by the type of input device used or the designation of the input device control action associated with operations within the GUI. I/O interface(s) 140 allows for input and output of data with other devices that may be connected to computing device 105, such as output display 110, and is further described in discussions of FIG. 8.

Communications unit 120 provides communications between computing device 105 and other data processing systems by connection to network 150. Communications unit 120 connects to network 150 using one or more network interface cards, or through the use of either or both physical and wireless communications links as described further in discussion of FIG. 8.

Network 150 interconnects computing device 105 with other computing devices and resources. Network 150 may be, for example, a local area network (LAN), a wide area network (WAN) such as the Internet, or a combination of the two, and can include wired or wireless connections. In general, network 150 can be any combination of connections and protocols that will support communications via suitable channels between computing device 105 and other computing devices and resources, in accordance with an embodiment of the present invention.

Figure 2:
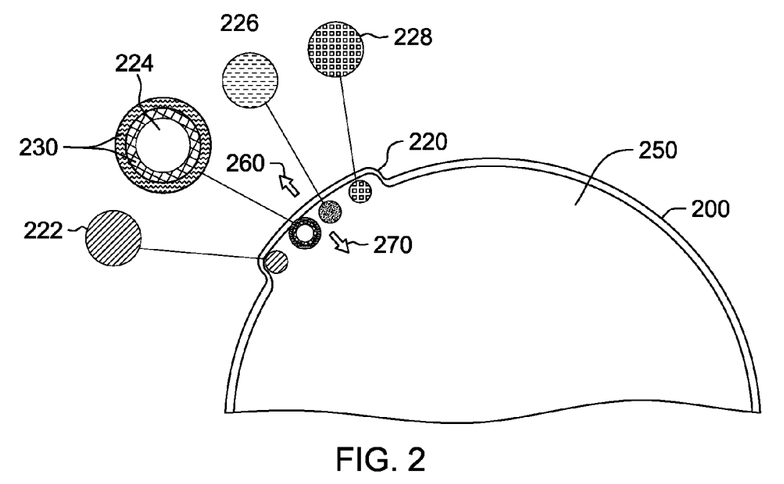
FIG. 2 is a block diagram illustrating a portion of a circular-shaped graphical user interface element with a peripherally positioned menu tab depicting an extension of the icons of the menu tab, in accordance with an embodiment of the present invention.

FIG. 2 is a block diagram illustrating a portion of a graphical user interface element with a peripherally positioned menu tab depicting an extension of the icons of the menu tab, in accordance with an embodiment of the present invention. In one embodiment, GUI element 200 is a floating window and includes icons representing contextual function options that when selected are applied to the content visible within GUI element 200. Menu tab 220 is selected by an input device associated with computing device 105, and becomes the currently active menu tab. The close proximity and consistent location of a menu tab simplifies discovery of contextual functions, having properties or actions interrelated with the content of GUI element 200, without the loss of focus on the content of GUI element 200.

Embodiments of the present invention include a menu tab with one or more selectable menu option indicators, such as icons, which are each associated with an icon function. When an icon is selected, the icon function associated with the icon, performs a type of modification to the content of GUI element 200. The type of modification may include filtering or removing content displayed within GUI element 200, adding content to GUI element 200, or a combination of filtering and adding of content. Icons are graphical images positioned within the menu tab and may be displayed as extended and enlarged in size to improve recognition, as a result of input received. In one embodiment of the present invention, a menu tab may include any number of icons that can be accommodated within the boundaries of a menu tab while providing for adequate GUI element display area and recognition of the icons.

Menu tab 220 includes icons 222, 224, 226, and 228 displayed within menu tab 220. Icons 222, 224, 226, and 228, initiate contextual functions when selected and apply a specific icon function to internal content 250. Additionally icons may be used to provide feedback, monitor or change the state of the content within the GUI element, the underlying displayed data, or both. The state of the GUI element content or displayed underlying content may include but is not limited to one or a combination of: information indicating an alert, information indicating an alarm, the current active menu tab, menu tab "ready to drag", and the current active icon applied to the GUI element content.

Internal content 250 is content displayed within the transparent portion of GUI element 200, from an application running on computing device 105, displayed in the underlying GUI element, and modified by tab program 125, based on a selected icon, within GUI element 200. Indicator 230 is depicted as a highlight or "glow" surrounding icon 224 and indicates that icon 224 is selected and the icon function of icon 224 is actively applied to internal content 250 of GUI element 200. Indicator 230 can be highlighting, change of color, a glowing effect, shading, blinking or other form of formatting or visual effect that indicates the associated icon is selected, and the function associated with the icon has been applied to the content of the GUI, such as internal content 250. In a preferred embodiment, indicator 230 is one or a combination of: conversion of a symbol or icon to text, conversion of text to an icon or symbol, animated movement of the icon, such as spinning or oscillating, or highlighted background surrounding the icon with alternating color changes. Additionally icons can blink, change color, change brightness or make other formatting changes surrounding the icon to indicate a status or state of either or both of the GUI element content and the underlying content, for example, an icon may display a yellow or orange color to indicate an error or potential issues.

For example, if internal content 250 includes a satellite image or a map of an area, icon 222 provides a "zoom in", function and icon 224 provides a "zoom out" function, if selected. Additionally, selection of icon 226 may display locations on the image or map where food may be purchased, whereas icon 228 may display the locations where fuel may be purchased, when selected. If icon 228 is selected, icon indicator 230 is applied to icon 228, indicating that icon 228 has been selected and the function depicting locations for fuel purchase has been applied to internal content 250.

Additionally, FIG. 2 illustrates a functional behavior of menu tab 220, in accordance with an embodiment of the present invention. User interface 200 is depicted as including swipe-out arrow 260 and swipe-in arrow 270. Icons 222, 224, 226, and 228 are shown extended from menu tab 220 and enlarged, which enables recognition and selection of the icon to apply the icon function that the icon represents, to internal content 250.

In one embodiment of the present invention, swipe-out arrow 260 becomes visible and may include animated movement outward, when a pointing device, such as a mouse pointer, is "hovered" over menu tab 220. The hovering action that initiates swipe-out arrow 260 involves menu tab 220 having been selected, positioning the pointing device cursor over menu tab 220, and holding the pointing device cursor in position for a brief period, for example 1.5 seconds or greater. This is referred to as "hovering".

In an exemplary embodiment, positioning the cursor of a mouse pointer over menu tab 220 for 1.5 seconds or greater, initiates the appearance of swipe-out arrow 260, near or adjacent to menu tab 220, for example, adjacent to the center of the outward edge of menu tab 220. Swipe-out arrow 260 points in a linear direction generally perpendicular to the outer edge of menu tab 220 and in one embodiment, away from internal content 250 and menu tab 220, so as to indicate movement or extension of part or all of menu tab 220. Swipe-out arrow 260 may also include animated movement outward from menu tab 220 during the hovering action. Selection of menu tab 220, such as by clicking a mouse button that has positioned the mouse cursor on or over menu tab 220, while holding the mouse button depressed and with a continuous movement, having minimal or no pause, moving the mouse pointer in the linear direction pointed by swipe-out arrow 260. The pointing device action also referred to as "swiping", results in icons 222, 224, 226, and 228, extending outward away from menu tab 220 in the linear direction pointed by swipe-out arrow 260, and the icons are increased in size to improve recognition. In other embodiments, the swiping movement may be towards internal content 250 and the icons may extend towards internal content 250. In yet other embodiments, the extending and enlarging of icons is a configurable option and may be enabled or suppressed.

In alternate embodiments, menu tab 220 in its entirety may respond to a swipe-out action, or increase in size in response to menu tab selection, or icons 222, 224, 226, and 228 may be selectable as originally positioned on menu tab 220 and require no movement or change in size to be selected. In different embodiments, the act of hovering over menu tab 220 may result in the display of descriptive text that may include the icon function of selections available on menu tab 220, or in yet other embodiments the hovering and swiping features may not be enabled.

Swipe-in arrow 270 acts in a manner similar to swipe-out arrow 260, however, it points in a linear direction opposite to swipe-out arrow 260 and may include animated movement in the opposite direction of swipe-out arrow 260. In one embodiment swipe-in arrow 270 appears when the pointing device cursor is hovered over menu tab 220 or the area of extended icons 222, 224, 226, and 228, and clicking on the menu tab 220 or the area of extended icons 222, 224, 226, and 228, and swiping the pointing device cursor in the linear direction of swipe-in arrow 270, results in the icons returning to their original size and position on menu tab 220.

Figure 3:
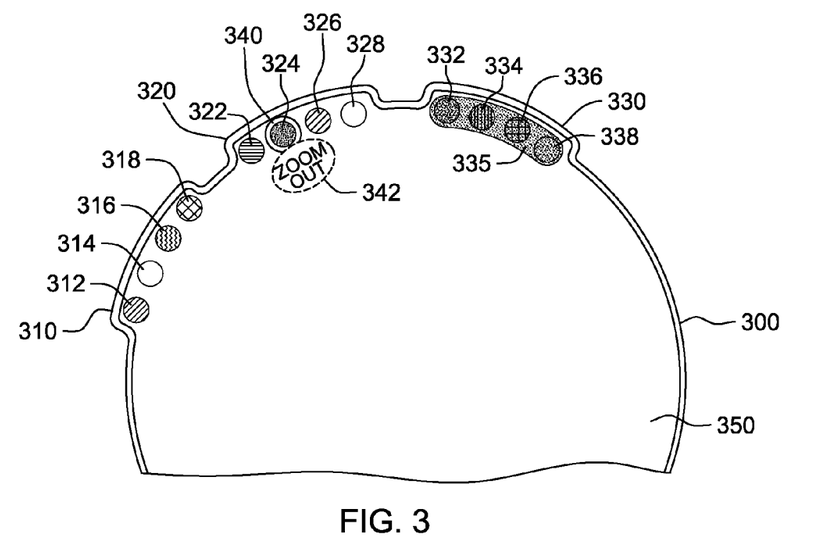
FIG. 3 is a block diagram illustrating a portion of a graphical user interface element with multiple menu tabs with icons, in accordance with an embodiment of the present invention.

FIG. 3 is a block diagram illustrating a portion of a GUI with multiple menu tabs, each including icons, in accordance with an embodiment of the present invention. GUI element 300 is shown including internal content 350 and menu tabs 310, 320, and 330. In one embodiment of the present invention, a menu tab includes one or more icons, each corresponding to a specific icon function that is applied to internal content 350 when the corresponding icon is selected. In another embodiment, the state associated with the selection of an icon may be applied to either or both internal content 350 and system data displayed underlying internal content 350.

Menu tab 310 includes icons 312, 314, 316, and 318, all of which have contextual icon functions that are generally related, such that icons 312, 314, 316 and 318 are grouped within the same menu tab, for example, menu tab 310, and are associated with related modifications or types of modifications. Similarly, menu tab 320 includes icons 322, 324, 326, and 328, which are related in contextual function and grouped within menu tab 320. In one embodiment of the present invention, icon 312 performs an icon function associated with a "first" type of modification. Icon 322 of menu tab 320 performs a different icon function and is associated with a "second" type of modification. Menu tab 330 includes icons 332, 334, 336, and 338, of which icon 332 is associated with a "third" type of modification, for example, displaying the electrical power grid on the underlying map area. Icons 334, 336, and 338 have different, but related icon functions, displaying other public utility features on the underlying map area when selected.

GUI element 300 displays content from the underlying GUI element, falling within the transparent portion of GUI element 300, such as internal content 350. When selected, the icons within menu tabs 310, 320, and 330 apply an icon function that filters or enhances internal content 350, or both filters and enhances internal content 350. The displayed position of GUI element 300 can be moved by use of a pointing device or other input command. Movement of GUI element 300 results in a change to the content within the transparent portion of GUI element 300. Upon movement of GUI element 300, additional content from the underlying GUI element falls within the transparent portion of GUI element 300, and content previously within the transparent portion of GUI element 300 falls outside the transparent portion.

Icon 324 of menu tab 320 includes indicator 340 represented as a contrasting area encircling icon 324. When a menu tab is selected the icons included within the menu tab become active and can be selected. Selection is made by use of a user-controlled pointing device. In one embodiment of the present invention in which a user interface, such as GUI element 300, includes more than one menu tab, a selected menu tab is indicated by applying a change to the display of the menu tab. The change to the selected menu tab consists of one or a combination of: reduction of the transparency level of the menu tab making it more opaque, outlining the menu tab in at least two contrasting colors, removal of semi-transparent shading. For example, menu tab 330 is depicted in FIG. 3 as having semi-transparent shading 335 over icons 332, 334, 336, and 338, indicating for exemplary purposes, that the menu tab is not currently selected. In other embodiments, additional visual effects, such as highlighting or flashing may be added for emphasis or recognition.

Indicator 340 appears when an icon, for example icon 324, of an active menu tab is selected, and in one embodiment, is a visual effect, format or technique that indicates that icon 324 is selected. In an exemplary embodiment, the selected icon is converted to descriptive text when selected, as illustrated by text indicator 342 and discussed previously with respect to FIG. 2. Internal content 350 includes content associated with an application displayed within GUI element 300 and the selection of a menu tab and corresponding icon grouped within the menu tab, applies a specific icon function to internal content 350.

For example, in an embodiment of the present invention, GUI element 300 is a floating window that displays a portion of a map of a suburban area, which is included in internal content 350. Menu tab 310 includes icon 312 and 314 that apply and remove labeling to the roadways and key structures within the displayed map area, respectively. Menu tab 310 also includes icon 316 that identifies areas of high traffic congestion of labeled roadways that are included in the underlying map and displayed within internal content 350 of GUI element 300, when icon 316 is selected, and icon 318, when selected, displays areas of known roadway construction. In general, the map content within internal content 350 of GUI element 300 is modified by applying the icon function of the selected icon of menu tabs 310, 320, or 330. In alternative embodiments, two or more icons may be selected from one or more menu tabs of GUI element 300, and the combined icon functions are applied to the content displayed with internal content 350 of GUI element 300.

Continuing with the example of multiple menu tabs positioned on GUI element 300, menu tab 320 is positioned between menu tabs 310 and 330 at the periphery of GUI element 300. Menu tab 320 provides topographical context to the suburban map area, displaying contour elevation lines. Icons 322 and 324 apply and remove labeling to the contour elevation lines and structures included in GUI element 300, respectively. Icon 322 displaying contour elevation lines in English units and selecting 322 again toggles the elevation numbers to Metric units.

In one embodiment of the present invention, selecting icon 324 alternatively results in conversion of icon 324 to text 342, indicating the icon has been selected. Text 342 illustrates an alternative indicator technique of the selection of icon 324 in which the selected icon is converted to descriptive text, replacing 324, however, to illustrate this indicator technique, text 342 and icon 324 are both shown in FIG. 3 (the text "ZOOM OUT" in FIG. 3 is presented only as an example of the conversion to descriptive text technique). Icon 326 applies different increments of elevation contour lines displayed in GUI element 300 toggling in increments of 5 units between contour lines (e.g. 5-10-15-20, etc.). Icon 328 applies shading that identifies public or government held property.

Further describing the example, selecting menu tab 320 with a mouse or pointing device, the map area displayed in internal content 350 changes to include elevation contour lines with a default increment between contour lines. Selecting icon 322 applies the contour number (English units) and structure labels to the area of the map displayed in internal content 350. Selecting icon 322 again changes the elevation contour numbers to units of meters. Selection of icon 324 removes the contour number and structure labels from the area of the map displayed in internal content 350. Selection of icon 326 applies different increments between the contour lines of the map area, for example, in increments of 5 feet, or selecting icon 326 a second time, increments of 10 feet between contour lines, and selecting the icon a third time removes the elevation numbers. Selecting icon 328 applies contrasting shading to areas of the map displayed in internal content 350. One type of shading identifies regions that are public lands or owned and managed by a level of the government.

Continuing with the example, menu tab 330 includes icons with icon functions that display the position and path of public utility infrastructures applied to the map area in internal content 350, when selected. Icon 332 applies the electrical power utility grid for the map area, when selected, including transmission lines above and below ground, substations, transformers and surge arrestors. Icon 332 may also indicate a warning state for irregular conditions detected, which may be indicated by a flashing orange color for the section that requires attention. Selection of icon 334 displays the underground gas lines and control points of the map area displayed in internal content 350 and icon 336 illustrates the water supply system for the suburban area, when selected, showing water source, treatment plants, pumps, storage tanks, distribution lines, and control points. Icon 338 overlays the map area displayed in internal content 350 with the run-off storm drain system of the suburban map area.

The above example describes a possible embodiment of the present invention in which a single floating window GUI element, such as GUI element 300, includes multiple menu tabs. Each menu tab includes one or more icons that are associated with one or a combination of icon functions that are applied to the content displayed within the GUI element, when selected. The described icon functions are meant to illustrate the use of icons included within menu tabs of a GUI element to modify the content displayed within the transparent portion of the GUI element. Other implementations are possible and thus the invention should not be limited to use solely in a specific application identified and/or implied by examples.

Figure 4:
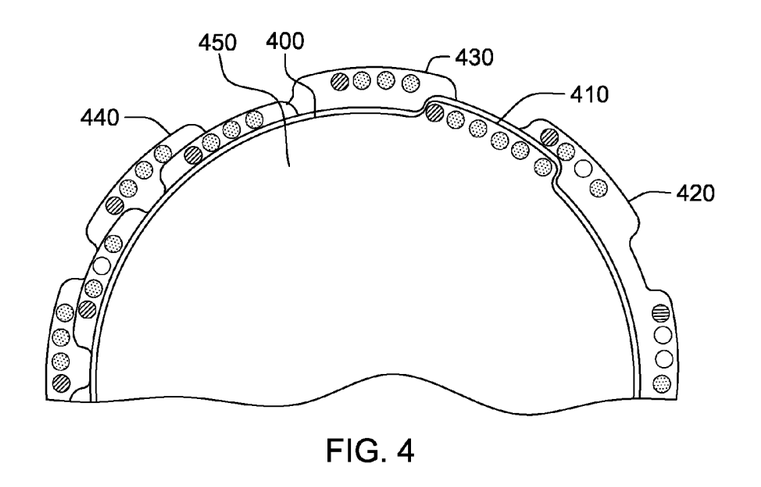
FIG. 4 is a block diagram illustrating multiple stacked circular-shaped graphical user interface elements with peripherally positioned menu tabs, in accordance with an embodiment of the present invention.

FIG. 4 is a block diagram illustrating multiple stacked circular-shaped graphical user interface elements with peripherally positioned menu tabs, in accordance with an embodiment of the present invention. A plurality of respective GUI elements in a layered alignment is shown, in which each of the respective GUI elements is orientated one upon the other, with only their respective menu tabs extending from the periphery of the top-most displayed GUI element. This alignment is subsequently referred to as "stacked". The GUI elements may include a varying amount of transparency to achieve the required viewable content in the stacked GUI elements. Stacked GUI elements may be used one at a time, or in combination. GUI element 400 is positioned at the top position of the stacked GUI elements, displaying internal content 450 and includes menu tab 410 located on the edge of GUI element 400. Each GUI element includes a menu tab, by which the GUI element is selected. The menu tab of each GUI element is arranged in a position around the outer edge of the stack of GUI elements, such that the menu tab of each is offset from the others, making the menu tabs visible and accessible for selection. The menu tabs for GUI elements positioned further down in the stack of GUI elements, extend further outward to enable visibility and accessibility, which may be hidden by use of a configurable toggle command, to simplify displayed content. The extension of menu tabs positioned further down in the stack is depicted by menu tabs 420, 430 and 440, as compared to menu tab 410.

In one embodiment, the positioning of a menu tab is aligned with the related types of contextual options associated with the group of icons in the menu tab. For example, the menu tab of a GUI element with respective icons associated with respective formatting properties of the GUI element, may consistently be positioned at or near the top center position of the stack as is depicted by menu tab 430, and the menu tab with respective icons whose respective icon functions are associated with editing and inserting text within the GUI element, is positioned at or near the upper left side of the stack, as depicted by menu tab 440. In this manner the position of a menu tab at the periphery of the respective GUI element indicates the grouping of icons within a menu tab having related but respective icon functions. In another embodiment, the position of the menu tab may be associated with the position of the GUI element in the stack of multiple GUI elements, such that the top most GUI element at a "one o'clock" position and each subsequent GUI element in the stack is located adjacent to and clockwise from the previous GUI element in the stack (not shown).

To prevent complete overlap, menu tabs positioned further down the stack (towards the bottom of stacked GUI elements) may extend further outward, further away from the center of the stack of GUI elements than menu tabs positioned towards the top of the stack. For example, menu tab 430, positioned further down in the GUI element stack, extends further outward than menu tab 410, which is positioned at the top of the stack. Displaying menu tabs in this manner provides easy access to select GUI elements at any position in the stack.

Figure 5:
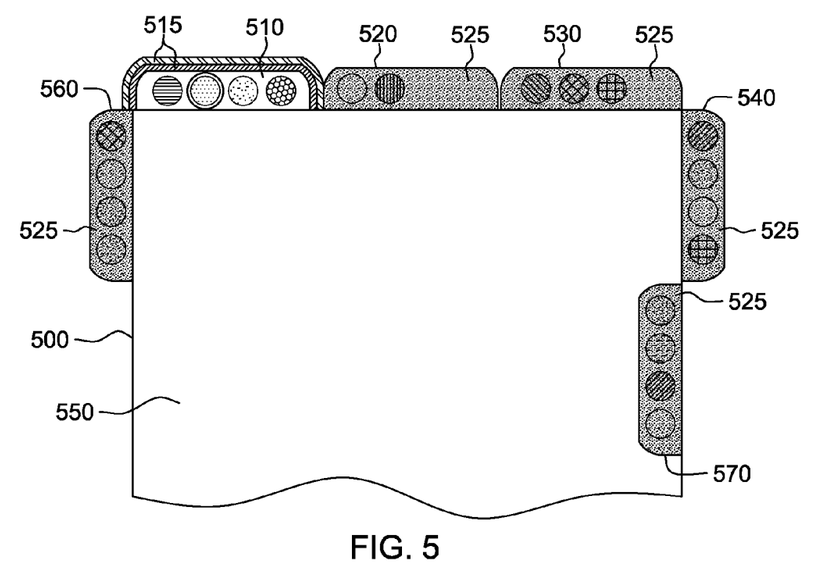
FIG. 5 is a block diagram illustrating a rectangular-shaped graphical user interface element including multiple peripherally positioned menu tabs, in accordance with an embodiment of the present invention.

FIG. 5 is a block diagram illustrating a rectangular-shaped graphical user interface element including multiple peripherally positioned menu tabs, in accordance with an embodiment of the present invention. A partial image of rectangular GUI element 500 is shown, which includes multiple menu tabs 510, 520, 530, 540, 560 and 570, and internal content 550, semi-transparent shading 525, and menu tab indicator 515. Internal content 550 is a display of content to which the contextual icon function associated with a selected icon of a menu tab, has been applied. The menu tabs are shown positioned around different points of the periphery of GUI element 500 avoiding complete overlap, illustrating that the menu tabs can assume a variety of positions that best meets the requirements of an implementation. Menu tab 570 is alternatively positioned within internal content 550, instead of assuming a position external to internal content 550 at the periphery of GUI element 500, such as menu tab 540.

Menu tab 510 is illustrated as including menu tab indicator 515, depicting menu tab 510 as a selected menu tab. In one embodiment, menu tab indicator 515 is comprised of two or more outline borders of menu tab 510 borders, in part or entirety, in which the outline borders are different colors, patterns or both. Menu tabs 520, 530, 540, 560, and 570 are illustrated with semi-transparent shading 525, covering the icons of the respective menu tabs, indicating the respective menu tabs are inactive.

Figure 6:
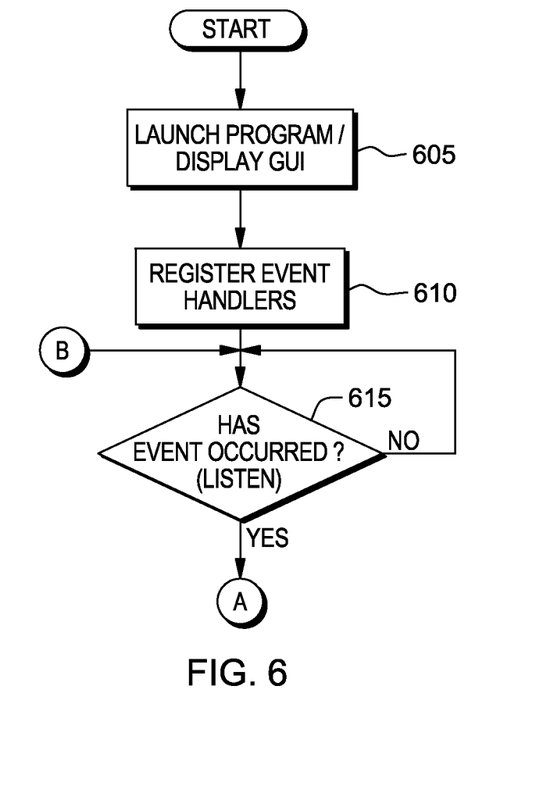
FIG. 6 is a flowchart depicting the steps followed by a menu tab program of a graphical user interface element, in accordance with an embodiment of the present invention.

FIG. 6 is a flowchart depicting the steps followed by tab program 125, in accordance with an embodiment of the present invention. Tab program 125 is launched and displays a GUI element (step 605), as a floating window, for example, GUI element 200 (FIG. 2), including menu tab 220 with icons 222, 224, 226, and 228, and displays the GUI element, menu tab, and icons on output display 110 of computing system 100. Tab program 125 creates a GUI element that applies contextual icon function to the content displayed within GUI element 200 when a menu tab icon is selected. In one embodiment of the present invention, tab program 125 is an event driven program and includes event handlers that determine if a particular event has occurred, and if so, processes defined programming steps, but otherwise waits in an event loop for an event to be detected, for example, receiving user input from a pointing device or keyboard. Tab program 125 works in association with content provided by other application sources, and adds contextual icon function to the content, when an icon is selected from the menu tab.

Tab program 125 registers the event handlers, also referred to as "listeners" which will monitor for a specific event or user input to occur (step 610). For example, tab program 125 registers an event handler for clicking the menu tab area of a GUI element with a pointing device and releasing in less than 1.5 seconds, or an event handler for clicking the menu tab area while holding the button depressed for less than 1.5 seconds, and moving the pointing device cursor in a direction away from the menu tab.

Tab program 125 uses an event loop to determine if an event has occurred, which is also referred to as "listening". For example, tab program 125 "waits" for input that is recognized by one of the registered event handlers. If the input event is recognized (step 615, "yes" branch), tab program 125 proceeds to additional processing designated by "A (step 615, "no" branch)", and otherwise continues to monitor for a recognized event to occur.

Figure 7:
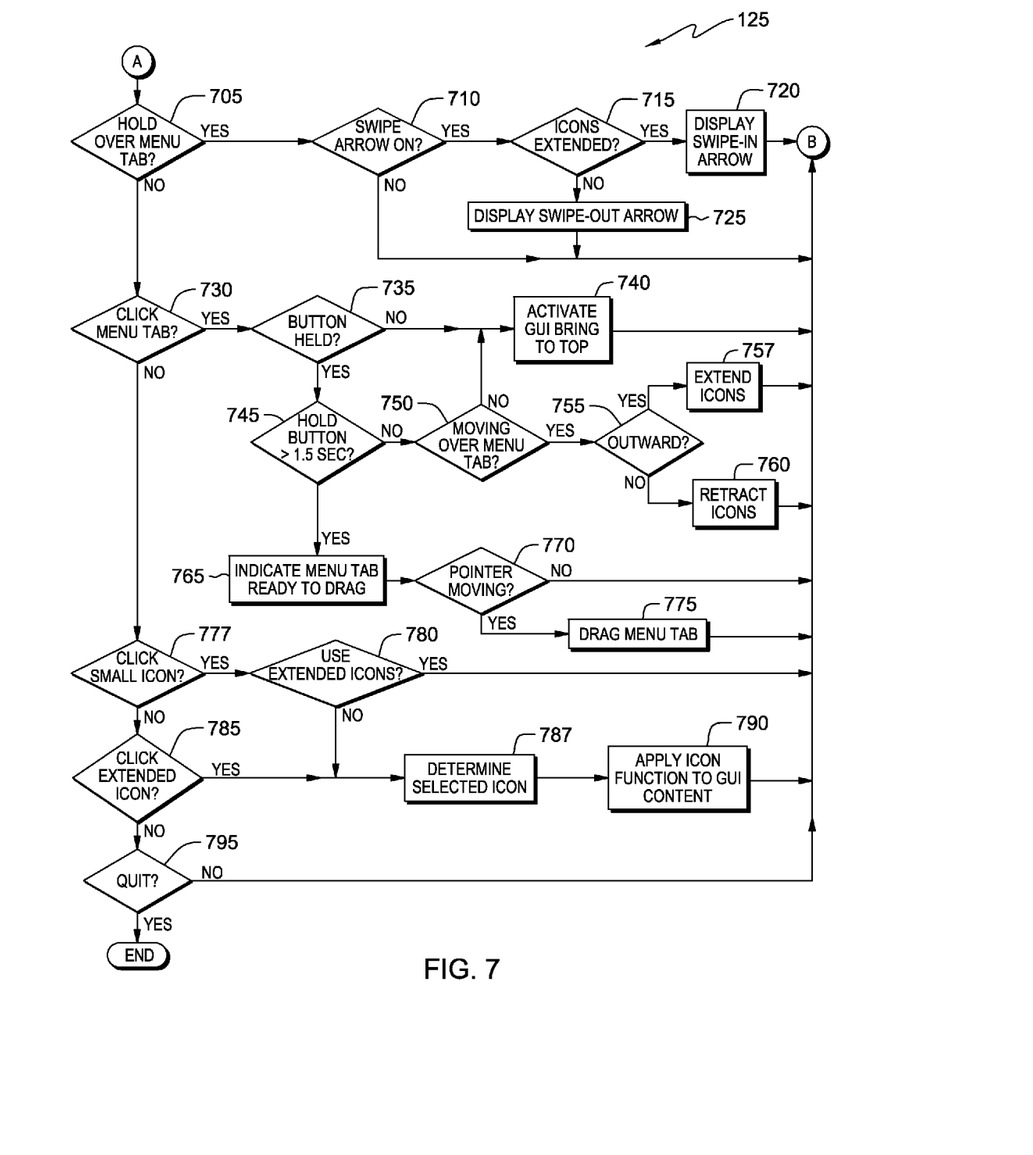
FIG. 7 is a flowchart depicting the steps followed by the menu tab program of the graphical user interface element, in accordance with an embodiment of the present invention.

FIG. 7 is a flowchart depicting the steps followed by a menu tab program of a graphical GUI element, in accordance with an embodiment of the present invention. An event as described herein refers to user-generated input, related to selection, movement or activation of features executed by tab program 125. Detecting an event (A), tab program determines which event has occurred. Tab program 125 determines that the event is a pointing device hovering over a selected menu tab (step 705, "yes" branch). Hovering is when a pointing device cursor is placed over an object and remains over the object without movement for a period of time, for example at least 1.5 seconds. For example, tab program 125 receives user input and determines that a pointing device cursor is hovering over menu tab 220 of GUI element 200 for a period of time greater than 1.5 seconds. Tab program 125 checks settings and may respond by displaying an arrow image pointing in a direction to swipe the menu tab, also referred to as a "swipe arrow". A swipe action refers to a combination of selection of a displayed area or object by a pointing device and continuous movement of the pointing device cursor after selection.

Tab program 125 determines if the configurable option of displaying a "swipe arrow" indicator is set to "on", and determining the swipe arrow option is set to "on" (step 710, "yes" branch), tab program 125 determines if the menu tab icons are in an extended position. If the menu icons are not extended (step 715, "no" branch), tab program 125 displays the swipe-out arrow (step 725), at or near the area of the selected menu tab and returns to monitor for the next event input (B). If tab program 125 determines that the menu icons are already extended (step 715, "yes" branch), the swipe-in arrow is displayed substantially in the area of the menu tab (step 720), and tab program 125 returns to monitor for the next event input (B). If the configurable option of displaying a "swipe arrow" indicator is set to "off" (step 710, "no" branch), then tab program 125 returns to monitor for the next input event.

For example, if the configurable option to display a swipe arrow is set to "on", tab program 125 determines if menu icon 220 (FIG. 2) is already extended, and if so, displays a "swipe-in" arrow substantially near menu tab 220, and if not, displays a "swipe-out" arrow. Tab program 125 then continues to monitor for the next event input (B).

If tab program 125 determines that the detected event is not a pointing device cursor hovering over the menu tab (step 705, "no" branch), tab program 125 determines if the received input matches a different event. Determining that the received input event is a pointing device click on a menu tab (step 730, "yes" branch), tab program 125 checks to determine if the button on the pointing device continues to be held. If the pointing device button is not being held (step 735, "no" branch), tab program 125 activates and brings to the GUI element associated with the clicked menu tab to the top of the display (step 740). If the selected GUI element is on a stack of multiple GUI elements, the selected GUI element is moved to the front-most position of the stack. Tab program 125 continues monitoring for an event input (B).

For example, tab program 125 determines that the input received is from a pointing device clicking on menu tab 430 (FIG. 4), which is associated with a GUI element in a stack of multiple GUI elements. Tab program 125 determines that the pointing device button is not held and has been released following a click on menu tab 430, which activates menu tab 430 making it the current active menu tab and displays the content of the GUI element associated with menu tab 430 as the top-most GUI element of the stack of multiple GUI elements. Tab program 125 subsequently continues to monitor for an event input (B).

If tab program 125 determines that the pointing device button is held (step 735, "yes" branch), the duration of holding the button is determined, and if the duration of holding the button does not exceed 1.5 seconds (step 745, "no" branch), tab program 125 proceeds to determine if the pointing device is moving over the menu tab area. Determining that the pointing device is moving over the menu tab (step 750, "yes" branch), tab program 125 further determines that the movement of the pointing device is in an outward direction away from the GUI element content (step 755, "yes" branch), and tab program 125 changes the position and size of the icons; extending the icons from the menu tab and enlarging the icons to facilitate identification (step 757). Tab program 125 continues to monitor for an event input (B).

For example, determining that input has been received indicating that the pointing device has been positioned on menu tab 220 (FIG. 2), and the pointing device button has been pressed, tab program 125 checks to determine if the button continues to be held in a depressed position. Confirming the button to remain depressed, tab program 125 determines if the duration in which the button is depressed exceeds 1.5 seconds, and not exceeding the 1.5 second duration, tab program 125 determines if the pointing device cursor is moving over the menu tab area. If the pointing device cursor is moving over the menu tab area, tab program 125 determines if the movement is outward, away from the GUI element content. Confirming that the movement of the pointing device cursor in the outward direction, tab program 125 extends the icons of menu tab 220, and continues to monitor for an event input (B).

If tab program 125 determines that the pointing device cursor is not moving in an outward direction away from the GUI element content, (step 755, "no" branch), then tab program 125 retracts the extended icons to their original position and size within the menu tab (step 760). If tab program 125 determines that the pointing device cursor is not moving over the menu tab (step 750, "no" branch), the cursor continues to be monitored until it is determined that the pointing device cursor moves over the menu tab area or the pointing device button has been released, in which case the menu tab is activated and brought to the top, forward-most position in the display (step 740), and tab program 125 continues to monitor for an event input (B).

If tab program 125 confirms that the pointing device button is held for more than 1.5 seconds, (step 745, "yes" branch), the menu tab selected by the pointing device displays an indication that the menu tab/GUI element is ready to be dragged to another position (step 765). The indication is a change to the menu tab appearance distinguishing it from other menu tabs and different from the currently active menu tab appearance. Tab program 125 determines if the pointing device cursor, or "pointer" is moving and confirming that it is moving (step 770, "yes" branch), re-positions the GUI element to correspond to the movement of the pointing device cursor, as in dragging the menu tab and GUI element (step 775), after which tab program 125 continues to monitor for an event input (B). If tab program 125 determines no movement of the pointer (step 770, "no" branch), the indication for the selected menu tab to be dragged is removed and tab program 125 continues to monitor for an input event (B).

For example, tab program 125 determines that the pointing device cursor is positioned over menu tab 220 and the pointing device button has been held for more than 1.5 seconds. Tab program 125 displays an indication that menu tab 220 is ready to be repositioned or dragged by moving the cursor, for example a slow blinking glow effect. The indicator confirms that the selected menu tab can be dragged to another position or dragged off the display screen. Determining that the pointing device cursor is moving, tab program 125 moves menu tab 220 and GUI element 200 to correspond to the movement of the pointing device cursor, ending the movement when the depressed pointing device button is released. If no movement is detected, menu tab 220 and GUI element 200 are not moved, and after the pointing device button is released, tab program 125 continues to monitor for an input event (B).

In the case in which tab program 125 determines that a received input event does not match with a pointing device button clicking on a menu tab (step 730, "no" branch), tab program 125 determines if the received input matches clicking small icons within a menu tab, when the pointing device button is depressed while the cursor is positioned over one of the icons included within the active menu tab. Tab program 125 determining that a received input event includes a pointing device click on a small icon within the active menu tab (step 777, "yes" branch), which includes positioning the pointing device cursor over an icon within the active menu tab, and the click-and-release of the pointing device selection button. Tab program 125 determines if the use of extended icons as a configurable option has been set to "on". Determining the use of extended icons to be set to "on" (step 780, "yes" branch), tab program 125 continues to monitor for event inputs, anticipating the selection of one of the extended icons.

In one embodiment, in which the option to use extended icons set to "on", tab program requires the menu tabs to be extended before the icons are active. In other embodiments, icons are active in both the extended presentation and with icons positioned within the menu tab. If tab program 125 determines that the use of extended icons is set "off" (step 780, "no" branch), tab program 125 determines the selected icon (step 787) and applies the icon function to the GUI element content (step 790), for the selected icon associated with the menu tab.

For example, tab program 125 determines that a user has clicked the pointing device on icon 324 within the active menu tab 320 (FIG. 3). Tab program 125 determines that the use of extended icons is optionally set to "on" and in one embodiment of the present invention, tab program 125 continues to monitor for input events. If tab program 125 determines that the use of extended icons is set to "off", the icon function associated with icon 324 is applied to the content of internal content 250, and tab program 125 provides an indicator to icon 324, for example, indicator 340, which may be a highlight, a "glowing" area, a format change, a brightness change, a color change or other manner of indicating icon 324 as a different state than other icons, such as icons 322, 326, and 328 (FIG. 3). In an alternative embodiment, selection of icon 324, which is not extended, and with use of extended icons set to "on", the icon function associated with icon 324 is applied to internal content 350 regardless of whether the extended and enlarged icon is selected or the small icon within menu tab 320 is selected (not shown in FIG. 7).

If tab program 125 determines that the received event input does not match a click on a small icon within the selected menu tab by a pointing device (step 777, "no" branch), tab program 125 determines if the received event input matches a click on an extended icon by a pointing device. Confirming that the input is a pointing device clicking on an extended icon (step 785, "yes" branch), tab program 125 determines which icon is selected (step 787), and applies the icon function associated with the selected icon to the content of the GUI element (step 790). Tab program 125 subsequently continues to monitor for an event input (B).

For example, tab program 125 determines that icon 224, which is extended from tab 220, is selected by the pointing device clicking on extended icon 224. Tab program 125 applies the function associated with icon 224, which for example may be to display additional detail to internal content 250. Tab program indicates that icon 224 has been applied to internal content 250 by displaying an indicator associated with icon 224, indicating that the function of icon 224 has been applied to internal content 250. Subsequent to applying the function associated with icon 224, tab program 125 continues to monitor for an event input (B).

If tab program 125 determines that the received input event does not match a user clicking an extended icon (step 785, "no" branch), tab program 125 determines if the received event input is to quit tab program 125 (decision step 795). Confirming a received input to quit tab program 125 (step 795, "YES" branch), tab program ends. If the input received does not terminate tab program 125, or match the other event handlers for tab program 125 (step 795, "NO" branch), the program continues to monitor for an event input (B).

Many different implementations are possible for behavior, selection, movement, state, and enhancement of menu tabs, icons, and GUI elements. Embodiments described herein are intended to describe exemplary implementations and are not meant to limit or exclude alternative implementations.

Figure 8:
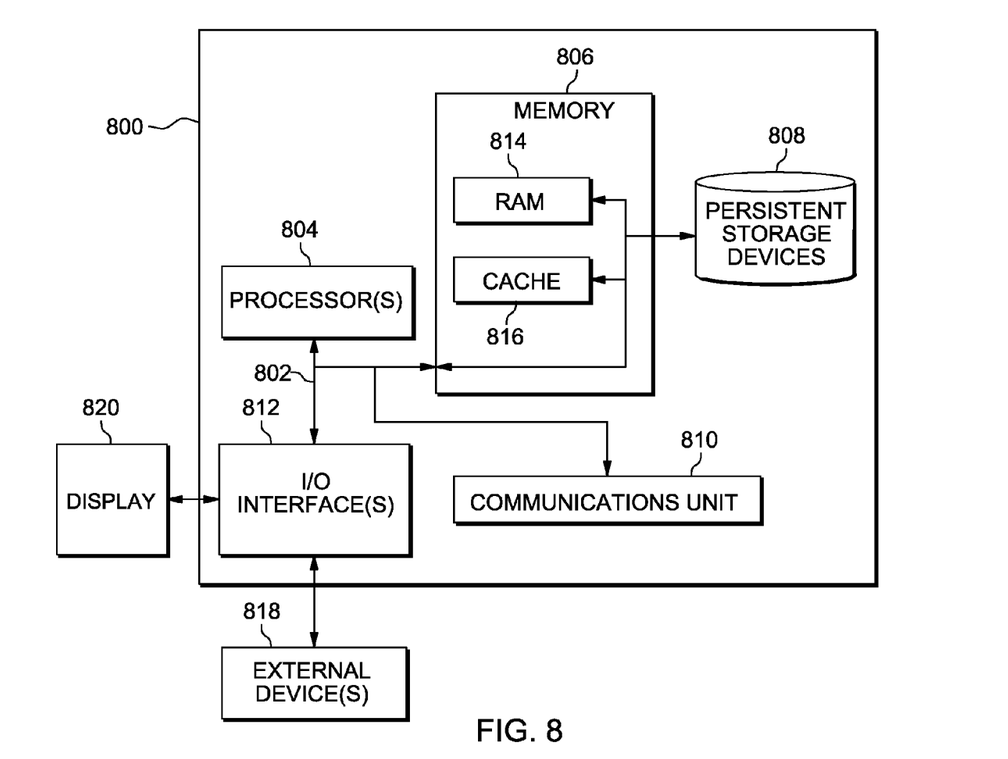
FIG. 8 depicts a block diagram of components of a computing system of FIG. 1 executing the menu tab program, in accordance with an embodiment of the present invention.

FIG. 8 depicts a block diagram of components of a computing system of FIG. 1 executing the menu tab program, in accordance with an embodiment of the present invention. Computing devices, such as computing device 105, include computing components 800. It should be appreciated that FIG. 8 provides only an illustration of one implementation and does not imply any limitations with regard to the environments in which different embodiments may be implemented. Many modifications to the depicted environment may be made.

Computing components 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Tab program 125 is stored in persistent storage 808 for execution by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of computing device 105. In these examples, communications unit 810 includes one or more network interface cards. Communications unit 810 may provide communications through the use of either or both physical and wireless communications links. The program instructions for tab program 125 may be downloaded over a network from a remote data processing system, to persistent storage 808, through communications unit 810.

I/O interface(s) 812 allows for input and output of data with other devices that may be connected to computing components 800. For example, I/O interface 812 may provide a connection to external devices 818 such as a keyboard, a mouse, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., tab program 125, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for modifying content displayed on a computing device, the method comprising:

displaying a set of graphical user interface (GUI) elements overlaying a portion of underlying content, the set of GUI elements and the underlying content concurrently displayed on a graphical display device, wherein each GUI element of the set of GUI elements includes a transparent portion allowing at least a part of the underlying content to be viewable through each GUI element overlaying the underlying content, and each GUI element of the set of GUI elements includes a respective set of menu tabs, each menu tab attached to a peripheral border of the respective GUI element, and within each menu tab a respective set of icons is included, each icon of a respective set of icons, when selected, initiates a function that is applied to the respective GUI element overlaying the portion of the underlying content;

receiving input selecting a first menu tab of the set of menu tabs of a first GUI element of the set of GUI elements, and input selecting a first icon from the set of icons of the first menu tab; and in response to receiving the input selecting the first icon, applying a first function to the transparent portion of the first GUI element overlaying the underlying content, wherein the first function performs a modification of the underlying content displayed on the transparent portion of the first GUI element overlaying the underlying content, wherein the modification includes adding or removing portions of non-transparency to the transparent portion of the first GUI element, and displaying the underlying content through portions of the first GUI element remaining transparent.

2. The method of claim 1, further comprising:

receiving input selecting a second menu tab, wherein the second menu tab is associated with the first GUI element and is displayed in a position along a peripheral border of the first GUI element;

receiving input selecting a second icon from the second menu tab associated with performing a second function;

and
performing the second function and maintaining the first function as a combined modification of the underlying content displayed within the first transparent portion of the first GUI element overlaying the underlying content, that includes the underlying content that is viewable within the transparent portion of the first GUI element.

3. The method of claim 1, further comprising:
displaying a second GUI element having a second transparent portion positioned over at least part of the first transparent portion of the first GUI element and at least part of the underlying content, the first transparent portion of the first GUI element positioned over at least part of the underlying content, wherein the second GUI element includes a peripherally positioned second menu tab, which includes within the second menu tab a second icon associated with a second function;
receiving input selecting the second icon; and
in response to receiving the input selecting the second icon, removing the first function made to the content displayed within the first transparent portion of the first GUI element and applying the second function to the content displayed within the second transparent portion of the second GUI element which includes at least part of the underlying content displayed that is viewable through the first transparent portion of the first GUI element and is viewable within the second transparent portion of the second GUI element.

4. The method of claim 1, further comprising:
receiving input indicating movement of the first GUI element; and
moving the first GUI element, based on the input, such that a portion of the underlying content that is external to the transparent portion of the first GUI element, becomes included within the transparent portion of the first GUI element.

5. The method of claim 1, further comprising:
aligning respective transparent portions of the set of GUI elements, the set of GUI elements including the first GUI element, and at least a second GUI element such that at least a part of the underlying content displayed within the transparent portion of the first GUI element, is displayed within an alignment of the respective transparent portion of the second GUI element of the set of GUI elements; and
displaying respective menu tabs of the first GUI element and the second GUI element of the set of GUI elements in peripheral positions on a border area of the alignment of the respective transparent portions of the first GUI element and the second GUI element of the set of GUI elements, wherein each respective menu tab is selectable.

6. The method of claim 1, further comprising:
receiving input from a pointing device indicating a selection by a pointing device cursor and a hold of a pointing device button, in an area of the first menu tab, and a movement of the pointing device cursor in a linear direction perpendicular to an outer border of the first menu tab; and
in response to receiving the input from the pointing device, changing the position of icons associated with the first menu tab corresponding to the linear direction of the movement of the pointing device cursor perpendicular to the outer border of the first menu tab, and changing a size of the icons of the first menu tab.

7. The method of claim 1, wherein responding to input selecting the first icon comprises applying a change to the display of the first icon that is selected, the change consisting of at least one of: conversion of the first icon displayed as an icon or symbol to text, conversion of the first icon displayed as text to an icon or symbol, animated movement of the first icon, highlighted background surrounding the first icon with contrasting lighting effects, and alternate display intensity, coloring, or shading of the first icon.

8. The method of claim 1, wherein a respective position of a respective menu tab of a respective GUI element of the set of GUI elements as located on the peripheral border of the respective GUI element, corresponds to a type of function which icons of the respective menu tab perform when selected, wherein icons of a menu tab positioned at a top right border of the respective GUI element perform a different type of function than icons of a menu tab located at a bottom center border of the respective GUI element.

9. The method of claim 1, further comprising:
receiving input selecting a second menu tab, wherein the second menu tab is associated with a second GUI element of the set of GUI elements which is stacked on the first GUI element, and the peripheral border of the first GUI element is aligned with a peripheral border of the second GUI element, with distinguishable respective menu tabs extended outward from the aligned peripheral borders;
receiving input selecting a second icon from the second menu tab of the second GUI element; and
performing a combination of the first function corresponding to the first icon of the first menu tab of the first GUI element and a second function of the second icon of the second menu tab of the second GUI element, wherein the first function performs a modification within the transparent portion of the first GUI element which overlays the underlying content, and the second function performs a modification within the transparent portion of the second GUI element which overlays the first GUI element, resulting in a combined modification of the underlying content as viewed through the second GUI element which is stacked on the first GUI element, overlying the underlying content.

10. A computer program product for modifying content displayed on a computing device, the computer program product comprising:
one or more non-transitory computer-readable storage media and program instructions stored on the one or more non-transitory computer-readable storage media, the program instructions comprising:
program instructions to display a set of graphical user interface (GUI) elements overlaying a portion of underlying content, the set of GUI elements and the underlying content concurrently displayed on a graphical display device, wherein each GUI element of the set of GUI elements includes a transparent portion allowing at least a part of the underlying content to be viewable through each GUI element overlaying the underlying content, and each GUI element of the set of GUI elements includes a respective set of menu tabs, each menu tab attached to a peripheral border of the respective GUI element, and within each menu tab a respective set of icons is included, each icon of a respective set of icons, when selected, initiates a function that is applied to the respective GUI element overlaying the portion of the underlying content:
program instructions to receive input selecting a first menu tab of the set of menu tabs of a first GUI element of the set of GUI elements, and input selecting a first icon from the set of icons of the first menu tab; and in response to receiving the input selecting the first icon, program instructions to apply a first function to the transparent portion of the first GUI element overlaying the underlying content, wherein the first function performs a modification of the underlying content displayed on the transparent portion of the first GUI element overlaying the underlying content, wherein the modification includes adding or removing portions of non-transparency to the transparent portion of the first GUI element, and displaying the underlying content through portions of the first GUI element remaining transparent.

11. The computer program product of claim 10, further comprising:
program instructions to receive input selecting a second menu tab, wherein the second menu tab is associated with the first GUI element and is displayed in a position along a peripheral border of the first GUI element;
program instructions to receive input selecting a second icon from the second menu tab associated with performing a second of function; and
program instructions to perform the second function and maintaining the first function as a combined modification of the underlying content displayed within the first transparent portion of the first GUI element overlaying the underlying content, that includes the underlying content of the underlying that is viewable within the transparent portion of the first GUI element.

12. The computer program product of claim 10, further comprising:
program instructions to display a second GUI element having a second transparent portion positioned over at least part of the first transparent portion of the first GUI element and at least part of the underlying content, the first transparent portion of the first GUI element positioned over at least part of the underlying content, wherein the second GUI element includes a peripherally positioned second menu tab, which includes within the second menu tab a second icon associated with a second function;
program instructions to receive input selecting the second icon; and
in response to receiving the input selecting the second icon, program instructions to remove the first function made to the content displayed within the first transparent portion of the first GUI element and apply the second function to the content displayed within the second transparent portion of the second GUI element which includes at least part of the underlying content displayed that is viewable through the first transparent portion of the first GUI element and is viewable within the second transparent portion of the second GUI element.

13. The computer program product of claim 10, further comprising:
program instructions to align respective transparent portions of the set of GUI elements, the set of GUI elements including the first GUI element, and at least a second GUI element such that at least a part of the underlying content, displayed within the transparent portion of the first GUI element, is displayed within an alignment of the respective transparent portion of the second GUI element of the set of GUI elements; and
program instructions to display respective menu tabs of the first GUI element and the second GUI element of the set of GUI elements in peripheral positions on a border area of the alignment of the respective transparent portions of the first GUI element and the second GUI element of the set of GUI elements, wherein each respective menu tab is selectable.

14. The computer program product of claim 10, further comprising:
program instructions to receive input from a pointing device indicating a selection and hold of a pointing device button in an area of the first menu tab, and a movement of the pointing device cursor in a linear direction perpendicular to an outer border of the first menu tab; and
in response to receiving the input from the pointing device, program instructions to change the position of icons associated with the first menu tab corresponding to the linear direction of the movement of the pointing device cursor perpendicular to the outer border of the first menu tab, and changing a size of the icons of the first menu tab.

15. The computer program product of claim 10, wherein program instructions determine that a respective position of a respective menu tab of a respective GUI element of the set of GUI elements as located on the peripheral border of the respective GUI element, corresponds to a type of function which icons of the respective menu tab perform when selected, wherein icons of a menu tab positioned at a top right border of the respective GUI element perform a different type of function than icons of a menu tab located at a bottom center border of the respective GUI element.

16. The computer program product of claim 10, further comprising:
program instructions to receive input selecting a second menu tab, wherein the second menu tab is associated with a second GUI element of the set of GUI elements which is stacked on the first GUI element, and the peripheral border of the first GUI element is aligned with a peripheral border of the second GUI element, with distinguishable respective menu tabs extended outward from the aligned peripheral borders;
program instructions to receive input selecting a second icon from the second menu tab of the second GUI element; and
program instructions to perform a combination of the first function corresponding to the first icon of the first menu tab of the first GUI element and a second function of the second icon of the second menu tab of the second GUI element, wherein the first function performs a modification within the transparent portion of the first GUI element which overlays the underlying content, and the second function performs a modification within the transparent portion of the second GUI element which overlays the first GUI element, resulting in a combined modification of the underlying content as viewed through the second GUI element which is stacked on the first GUI element, overlying the underlying content.

17. A computer system for modifying content displayed on a computing device, the computer system comprising:
a processor;
a tangible, computer-readable memory for storing program instructions, which when executed by the processor, perform actions of:
program instructions to display a set of graphical user interface (GUI) elements overlaying a portion of underlying content, the set of GUI elements and the underlying content concurrently displayed on a graphical display device, wherein each GUI element of the set of GUI elements includes a transparent portion allowing at least a part of the underlying content to be viewable through each GUI element overlaying the underlying content, and each GUI element of the set of GUI elements includes a respective set of menu tabs, each menu tab attached to a peripheral border of the respective GUI element, and within each menu tab a respective set of icons is included, each icon of a respective set of icons, when selected, initiates a function that is applied to the respective GUI element overlaying the portion of the underlying content:

program instructions to receive input selecting a first menu tab of the set of menu tabs of a first GUI element of the set of GUI elements, and input selecting a first icon from the set of icons of the first menu tab; and in response to receiving the input selecting the first icon, program instructions to apply a first function to the transparent portion of the first GUI element overlaying the underlying content, wherein the first function performs a modification of the underlying content displayed on the transparent portion of the first GUI element overlaying the underlying content, wherein the modification includes adding or removing portions of non-transparency to the transparent portion of the first GUI element, and displaying the underlying content through portions of the first GUI element remaining transparent.

18. The computer system of claim 17, further comprising: program instructions to align of respective transparent portions of the set of GUI elements, the set of GUI elements including the first GUI element, and at least a second GUI element such that at least a part of the underlying content, displayed within the transparent portion of the first GUI element, is displayed within an alignment of the respective transparent portion of the second GUI element of the set of GUI elements; and program instructions to display respective menu tabs of the first GUI element and the second GUI element of the set of GUI elements in peripheral positions on a border area of the alignment of the respective transparent portions of the first GUI element and the second GUI element of the set of GUI element, wherein each respective menu tab is selectable.

19. The computer system of claim 17, wherein program instruction determine that a respective position of a respective menu tab of a respective GUI element of the set of GUI elements as located on the peripheral border of the respective GUI element, corresponds to a type of function which icons of the respective menu tab perform when selected, wherein icons of a menu tab positioned at a top right border of the respective GUI element perform a different type of function than icons of a menu tab located at a bottom center border of the respective GUI element.

20. The computer system of claim 17, further comprising:
program instructions to receive input selecting a second menu tab, wherein the second menu tab is associated with the first GUI element and is displayed in a position along a peripheral border of the first GUI element;
program instructions to receive input selecting a second icon from the second menu tab associated with performing a second of function; and
program instructions to perform the second function and maintaining the first function as a combined modification of the underlying content displayed within the first transparent portion of the first GUI element overlaying the underlying content, that includes the underlying content that is viewable within the transparent portion of the first GUI element.

* * * * *